United States Patent [19]

Johnson et al.

[11] Patent Number: 5,325,310
[45] Date of Patent: Jun. 28, 1994

[54] METHOD AND SYSTEM FOR PERSISTANT ELECTRONIC MAIL REPLY PROCESSING

[75] Inventors: William J. Johnson, Flower Mound; Daniel P. Ristow, Watauga; Marvin L. Williams, Lewisville, all of Tex.

[73] Assignee: International Business Machines Corporation, Armonk, N.Y.

[21] Appl. No.: 905,055

[22] Filed: Jun. 26, 1992

[51] Int. Cl.5 .......................................... G06K 17/00
[52] U.S. Cl. .................................... 364/514; 358/402
[58] Field of Search ......................... 364/514; 358/402

[56] References Cited

U.S. PATENT DOCUMENTS

| | | | |
|---|---|---|---|
| 4,713,780 | 12/1987 | Schlutz et al. | 364/514 |
| 4,994,985 | 2/1991 | Cree et al. | 364/514 |
| 5,040,141 | 8/1991 | Yazima et al. | 364/900 |
| 5,057,935 | 10/1991 | Williams | 358/402 |
| 5,220,516 | 6/1993 | Dodson et al. | 364/514 |

Primary Examiner—Jack B. Harvey
Assistant Examiner—Thomas Peeso
Attorney, Agent, or Firm—Duke W. Yee; Andrew J. Dillon; Jonathan E. Jobe, Jr.

[57] ABSTRACT

A method and system in a data processing system, having a plurality of users enrolled therein and having a number of electronic mail objects which may be transmitted and received within the distributed data processing system, are provided for ensuring a specific response to a selected electronic mail object by a recipient thereof within the data processing system. The method and system include designating an electronic mail object as requiring a specific response and then transmitting the electronic mail object to a recipient. The recipient of the electronic mail object is prompted for a specific response in response to the recipient opening an electronic mail object and is prohibited from performing a selected action until the specific response has been entered by the recipient.

32 Claims, 6 Drawing Sheets

METHOD AND SYSTEM FOR PERSISTANT ELECTRONIC MAIL REPLY PROCESSING

BACKGROUND OF THE INVENTION

1. Technical Field

The present invention relates in general to an improved electronic mail system and in particular, to a method and system for an improved acknowledgement system for electronic mail objects distributed within an electronic mail system. Still more particularly, the present invention relates to a method and system for an improved acknowledgment system for electronic mail objects distributed within an electronic mail system through ensuring that an electronic mail object has been carefully examined by a recipient.

2. Description of the Related Art

Electronic mail or "E-Mail" systems are well known in the prior art. By "electronic mail system", what is meant is a system whereby messages, notes, and documents in the form of electronic mail objects may be sent and/or received between two computers or work stations. Electronic mail objects also include other items that may be transmitted to a user, such as, for example, voice or verbal messages, and non textual items like graphics or drawings that may be electronically transmitted. For example, two computers coupled together by a Local Area Network ("LAN") may be utilized to communicate detailed messages between the operators thereof. Similarly, two intelligent work stations coupled to a central processor may be utilized to transmit or receive electronic mail objects by utilizing well-known communication techniques.

The sending of electronic mail objects has become a common and popular method for distributing messages and information to numerous people within an organization or between organizations utilizing an electronic mail system. Upon the receipt of an electronic mail object, the recipient may choose to read the electronic mail object, file the electronic mail object, forward the electronic mail object to other users on the system, erase the electronic mail object, respond to the electronic mail object, or some combination of the foregoing options.

It is often desirable in an electronic mail system to distribute an electronic mail object to a number of users with the expectation of a reply confirming the reception and reading of the electronic mail object. For example, a company may send a notice to employees in the form of an electronic mail object, which should be read and understood by the employees. For various legal reasons, each employee is to send a note back, which states that it has been read and understood.

Presently available acknowledgement systems may indicate that an electronic mail object has been sent and received by a recipient, but do not provide a mechanism to ensure or compel a reply by the recipient. The various forms of acknowledgement that are presently available do not ensure that the recipient of the electronic mail object has actually read it, let alone read it carefully.

Consequently, there is a need for an electronic mail system having a mechanism for ensuring that a recipient of an electronic mail object will read it carefully.

SUMMARY OF THE INVENTION

It is one object of the present invention to provide a method and system for an improved electronic mail system.

It is another object of the present invention to provide a method and system for an improved acknowledgement system for electronic mail objects distributed within an electronic mail system.

It is yet another object of the present invention to provide a method and system for an improved acknowledgment system for electronic mail objects distributed within an electronic mail system through ensuring that an electronic mail object has been carefully examined by a recipient.

The foregoing objects are achieved as is now described. A method and system in a data processing system, having a plurality of users enrolled therein and having a number of electronic mail objects which may be transmitted and received within the distributed data processing system, are provided for ensuring a specific response to a selected electronic mail object by a recipient thereof within the data processing system. The method and system include designating an electronic mail object as requiring a specific response and then transmitting the electronic mail object to a recipient. The recipient of the electronic mail object is prompted for a specific response in response to the recipient opening the electronic mail object and is prohibited from performing a selected action until the specific response has been entered by the recipient.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
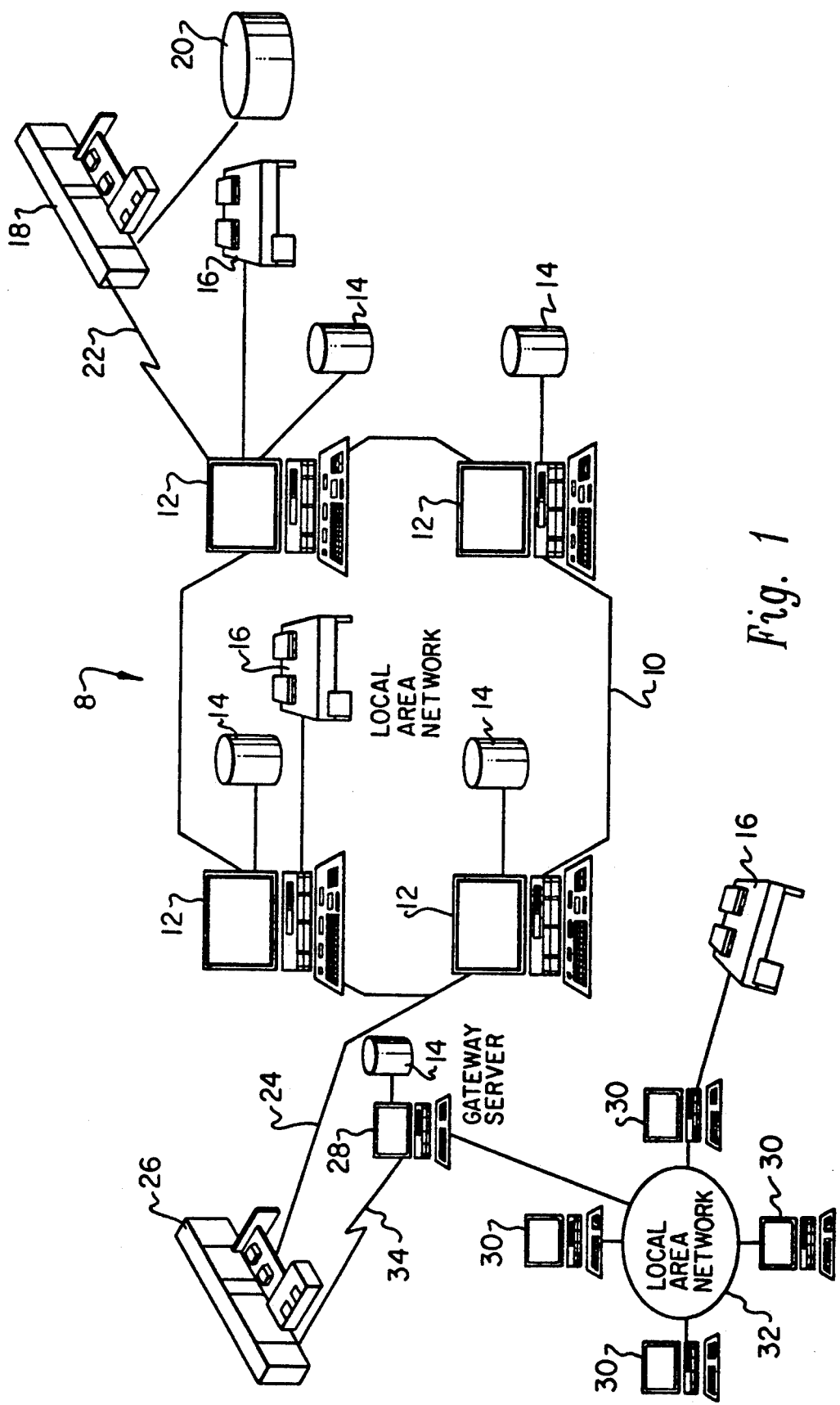
FIG. 1 depicts a pictorial representation of a data processing system, which may be utilized to implement the method of the present invention.

With reference now to the figures, and in particular with reference to FIG. 1, there is depicted a pictorial representation of a data processing system 8, which may be utilized to implement the method and system of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing network 8 may also include multiple mainframe computers, such as mainframe computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from Local Area Network (LAN) 10 and similarly Local Area Network (LAN) 10 may be located a substantial distance from Local Area Network (LAN) 32. For example, Local Area Network (LAN) 32 may be located in California while Local Area Network (LAN) 10 may be located within Texas and mainframe computer 18 may be located in New York.

A user located at an individual computer 12 in Local Area Network (LAN) 10 may desire to send an electronic mail object to another user in Local Area Network (LAN) 10 or to a user at an individual computer 30 in Local Area Network 32 utilizing an electronic mail system. The user may wish to ensure that the recipient views or carefully reads the electronic mail object by electing to require the recipient to reply or acknowledge the electronic mail object by entering data employing a preferred embodiment of the present invention. The electronic mail object may be in the form of text, an image, or a voice message.

In accordance with a preferred embodiment of the present invention, a mechanism for forcing a recipient to reply to an electronic mail object with data is included. For example, a company may send a notice to its employees which should be read and understood by the employees. For legal reasons, each employee is required to send a note back to the sender, which states that the electronic mail object has been read and understood. The present invention provides a mechanism whereby each recipient must reply with data stating that the electronic mail object has been read and understood. The data may be in the form of text, an image scanned into the data processing system, or a voice or verbal message digitized for transmission within a data processing system.

In another example, a company may be trying to obtain feedback on a new logo or design. An image of the logo or design may be transmitted to the employees. The present invention provides a mechanism by which each recipient must reply with data in response to viewing the logo or design.

In accordance with a preferred embodiment of the present invention, the mechanism may prevent the deletion and archival of the note or image until an appropriate reply is made. In fact, the sender of the electronic mail object may mark or associate an attribute with the electronic mail object such that it cannot be exited out of until the appropriate reply has been made. These attributes are called "persistent reply attributes".

Persistent reply attributes are set on an electronic mail object before the electronic mail object is sent for distribution. Interpretation of these persistent reply attributes indicate how the recipient data processing system should govern user interaction for forcing a reply containing data from the recipient of the electronic mail object. By default, the sender of the electronic mail object is assumed to be the recipient for the reply unless an override is set on the electronic mail object.

Figure 2:
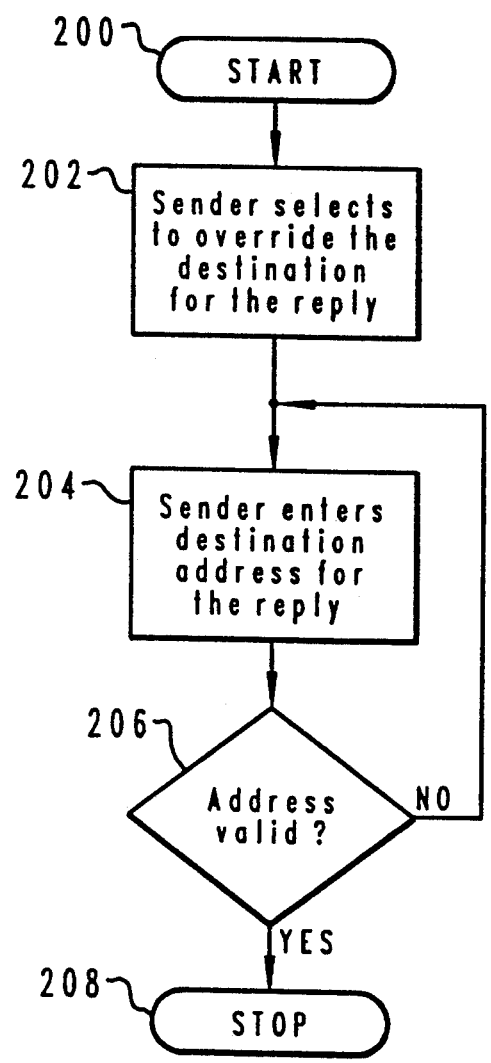
FIG. 2 is a high level flowchart of a method and system for selecting to override the default of the sender's mail address for the reply in accordance with a preferred embodiment of the present invention.

Referring now to FIG. 2, there is depicted a high level flowchart of a method and system for selecting to override the default of the sender's mail address for the reply in accordance with a preferred embodiment of the present invention. As illustrated, the process begins in block 200 and thereafter proceeds to block 202, which depicts a selection by the sender to override the destination for the reply to an electronic mail object selected for persistent reply. The override is achieved by setting a "persistent reply to report" attribute, which contains a destination address for the reply. This attribute may be the return address for the reply which would automatically pop into the recipient address on the reply or electronic mail object in accordance with a preferred embodiment of the present invention.

Next, the process proceeds to block 204, which illustrates the entering of a destination address for the reply by the sender. Afterwards, the process proceeds to block 206, which depicts a determination of whether or not the address entered by the user is valid. If the address is not valid, the process returns to block 204 so that the sender may enter another destination address for the reply. If the address is valid, the process terminates as illustrated in block 208. Following this method, the sender may designate another address as a destination address for the electronic mail object.

Figure 3:
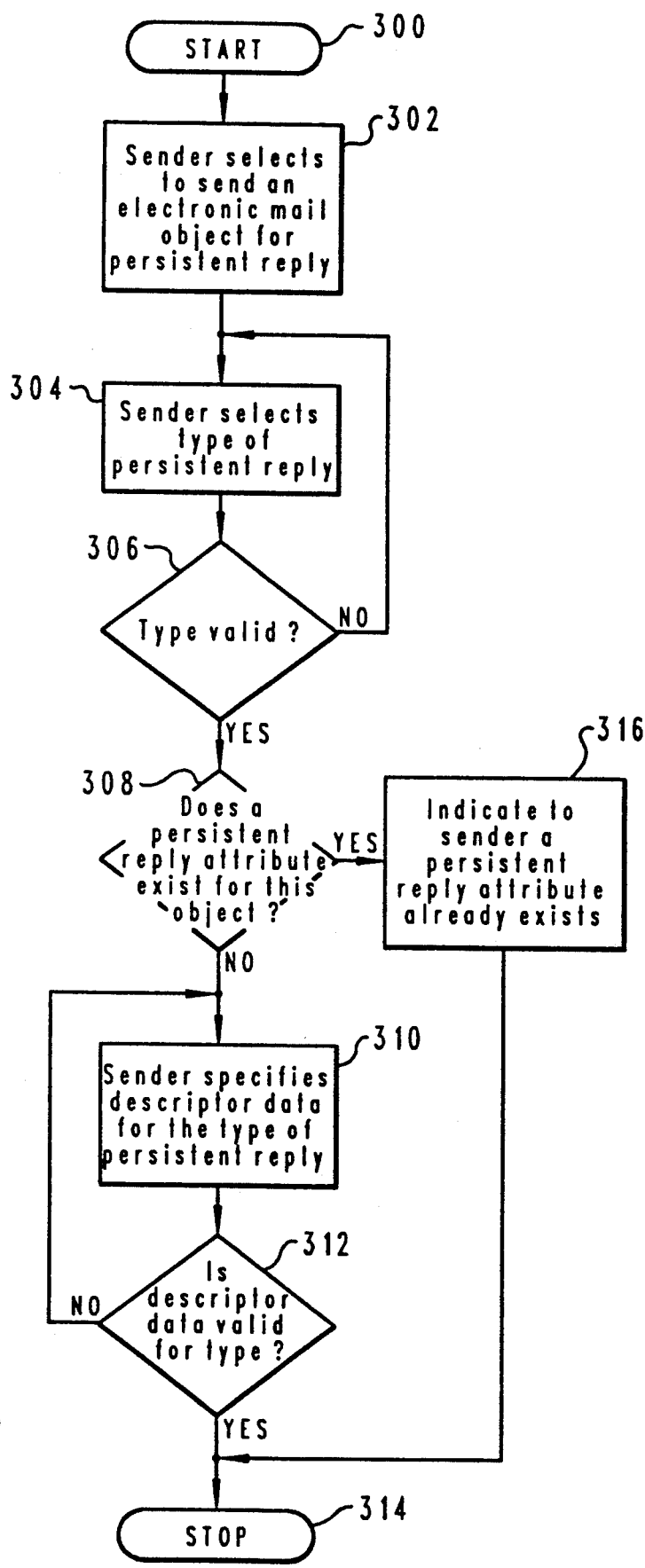
FIG. 3 depicts a high level flowchart of a method and system for selecting a persistent reply option during editing or sending of an electronic mail object in accordance with a preferred embodiment of the present invention.

With reference now to FIG. 3, there is depicted a high level flowchart of a method and system for selecting a persistent reply option during editing or sending of an electronic mail object in accordance with a preferred embodiment of the present invention. As illustrated, the process begins in block 300 and thereafter proceeds to block 302, which depicts a selection by the sender to send an electronic mail object for persistent reply. Next, the process proceeds to block 304, which illustrates a selection of the type of persistent reply desired by the sender. Thereafter, the process proceeds to block 306, which depicts a determination of whether or not the type of persistent reply selected by the sender is valid. If the type of persistent reply is not valid, the process then returns to block 304 so that the sender may select another type of persistent reply.

Referring back to block 306, if the type of persistent reply is valid, the process then proceeds to block 308, which illustrates a determination of whether or not a persistent reply attribute exists for the electronic mail object. If a persistent reply attribute does not exist for the electronic mail object, the process then proceeds to block 310, which depicts the sender specifying the descriptor data for the type of persistent reply. Descriptor data is the data required from a recipient of an electronic mail object selected for persistent reply in order to execute a proper reply. Next, block 312 depicts a determination of whether or not the descriptor data is valid for the type of persistent reply chosen. If the descriptor data is not valid for the type of persistent reply chosen, the process returns to block 310 so that the sender may specify data for the type of persistent reply desired. If the descriptor data is valid for the type of persistent reply chosen, the process then terminates as depicted in block 314.

Referring back to block 308, if a persistent reply attribute exists for the electronic mail object, the process then proceeds to block 316, which illustrates indicating to the sender that a persistent reply attribute already exists for the electronic mail object selected for a persistent reply. Again, the process thereafter terminates as depicted in block 314.

Various types of persistent reply attributes may be set for an electronic mail object, such as, for example, REPLY_DATA_LENGTH, CHARACTER_ABSENCE, KEYSTROKE_SAVE, and REPLY_DATA_BY_FIELD. The descriptor data for a REPLY_DATA_LENGTH persistent reply attribute is a numeric value indicating how many new characters must exist in the data body of the reply electronic mail object. Next, the CHARACTER_ABSENCE type of persistent reply attribute specifies a character which will be scanned for in the reply electronic mail object to determine whether or not the reply data entered by a recipient is satisfactory. The presence of this character in the reply electronic mail object will prevent a reply from being completed and sent by the recipient. Typically, an underscore character, "_", is utilized to define reply fields in an electronic mail object. The recipient of the electronic mail object would have to type over all of the underscore characters with other characters in order to enter a satisfactory reply to the electronic mail object.

Another type of persistent reply attribute that may be utilized in accordance with a preferred embodiment of the present invention is KEY_STROKE_SAVE, which involves selecting a numeric value, wherein the absolute value of this attribute indicates the number of keystrokes that a recipient of an electronic mail object is to hit before a satisfactory reply occurs. A negative numeric value indicates that the reply is forced immediately upon the Nth keystroke. A positive numeric value indicates that the recipient must initiate the reply with the usual interface, but the reply electronic mail object will not be sent unless the limit of keystrokes were hit.

Next, REPLY_DATA_BY_FIELD is a sophisticated persistent reply attribute that allows the sender of an electronic mail object to specify the field locations within an electronic mail object and what allowable textual characters may be made. In accordance with a preferred embodiment of the present invention, the data consists of tuples, where each tuple is defined by a name and a value or string. The tuple, OFFSET, is associated with an offset (a numeric value) from the original electronic mail object start to the first character in the field; the tuple, LENGTH, is associated with a numeric value, wherein the absolute value of the numeric value is the length of the data required, starting at the offset. Next, STRING is a tuple, which includes a string that is the actual singular allowable string allowed at the OFFSET for LENGTH characters. Blanks are included in the LENGTH value, and a negative LENGTH value indicates that a no mixed case is allowed in STRING, while a positive LENGTH value indicates that a mixed case is allowed in STRING. Additionally, STRING may include special characters from the upper character codes in a code page for special meanings such as wildcard, replication, etc.

In addition to the entry of data, a preferred embodiment of the present invention may be utilized to ensure that a recipient performs selected actions on the electronic mail object such as, for example, saving the electronic mail object. In such an example, the descriptor data may require a number of keystrokes, including a combination of control and function keys, to be entered by a recipient that would result in the electronic mail object being saved within the electronic mail system. These keystrokes would have to be entered by the recipient in order to exit the electronic mail object.

Additionally, persistent reply attributes may be also utilized to direct whether the recipient is to reply by utilizing a new electronic mail object, forwarding the electronic mail object with a new document appended to it, or resending the electronic mail object with overtyped or new characters added to the electronic mail object.

Those of ordinary skill in the art will recognize that the above described persistent reply types may be utilized with all types of a reply such as, for example, WYSIWYG mail, FORWARD, RESEND, REPLY, etc. It is also contemplated that persistent reply attributes may be utilized alone or in combination with other persistent reply attributes. Additionally, other types of persistent reply attributes may be utilized in addition to the examples described above. Verbal messages may be digitized for transmission within a data processing system utilizing well known analog to digital techniques. The present invention is not intended to be limited to text. For example, a persistent reply attribute may require an image to be scanned into the data processing system or may require a verbal message from the recipient to be digitally transmitted within the data processing system.

Figure 4:
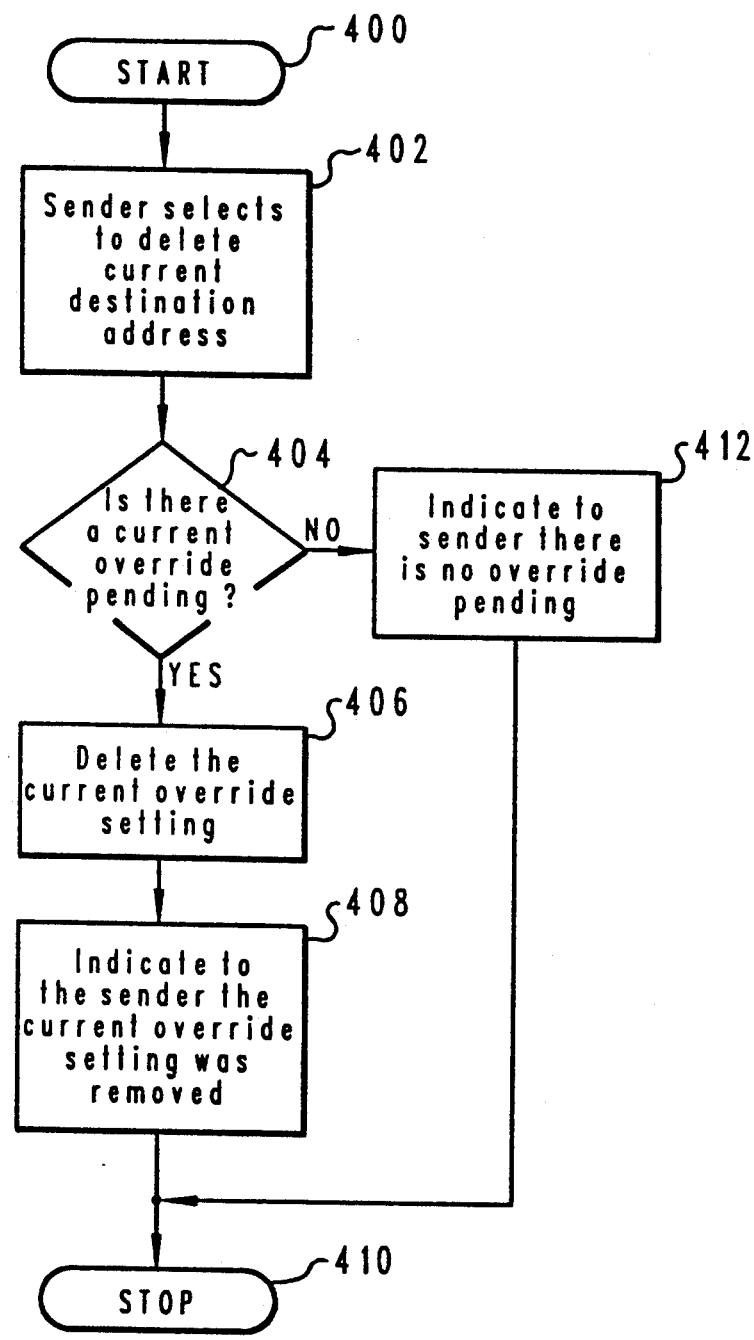
FIG. 4 is a high level flowchart of a method and system for selecting to remove an override for a destination address in accordance with a preferred embodiment of the present invention.

Referring now to FIG. 4, there is depicted a high level flowchart of a method and system for selecting to remove an override for a destination address in accordance with a preferred embodiment of the present invention. As illustrated, the process begins in block 400 and thereafter proceeds to block 402, which depicts a selection by the sender to delete the current destination address. It also is contemplated that multiple destination addresses may be employed in accordance with a preferred embodiment of the present invention. Next, the process to block 404, which illustrates a determination of whether or not a current override is pending. If a current override is pending, the process then proceeds to block 406, which depicts the deletion of the current override setting. Thereafter, the process proceeds to block 408, which illustrates an indication to the sender that the current override setting was removed. Afterwards, the process terminates as depicted in block 410.

Referring back to block 404, if a current override is not pending, the process proceeds instead to block 412, which illustrates an indication to the sender that no override pending is present. Again, the process thereafter terminates as depicted in block 410.

Figure 5:
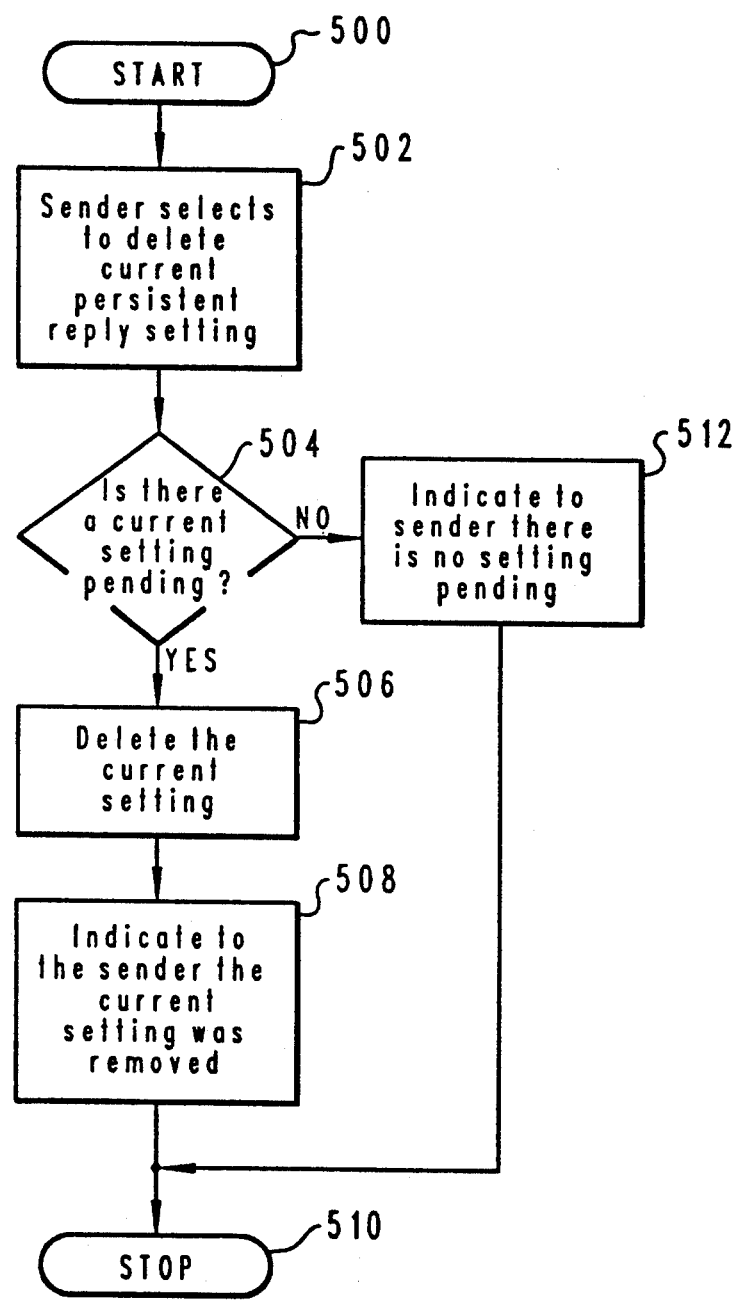
FIG. 5 depicts a high level flowchart of a method and system for selecting to remove a persistent reply setting in accordance with a preferred embodiment of the present invention.

With reference now to FIG. 5, there is depicted a high level flowchart of a method and system for selecting to remove a persistent reply setting in accordance with a preferred embodiment of the present invention. With this method, a sender may remove any attributes associated with an electronic mail object selected for persistent reply. As depicted, the process begins in block 500 and thereafter proceeds to block 502, which illustrates a selection by the sender to delete the current persistent reply setting. Next, the process proceeds to block 504, which depicts a determination of whether or not a current setting is pending. If a current setting is pending, the process then proceeds to block 506, which illustrates a deletion of the current setting. As a result, all persistent reply attributes that may be associated with the electronic mail object are removed from the electronic mail object. Then, the process proceeds to block 508, which depicts an indication to the sender that the current setting was removed. Thereafter, the process terminates as illustrated in block 510.

Referring again in block 504, if a current setting is not pending, the process then proceeds to block 512, which depicts an indication to the sender that no setting is pending. Thereafter, the process terminates as illustrated in block 510.

Figure 6:
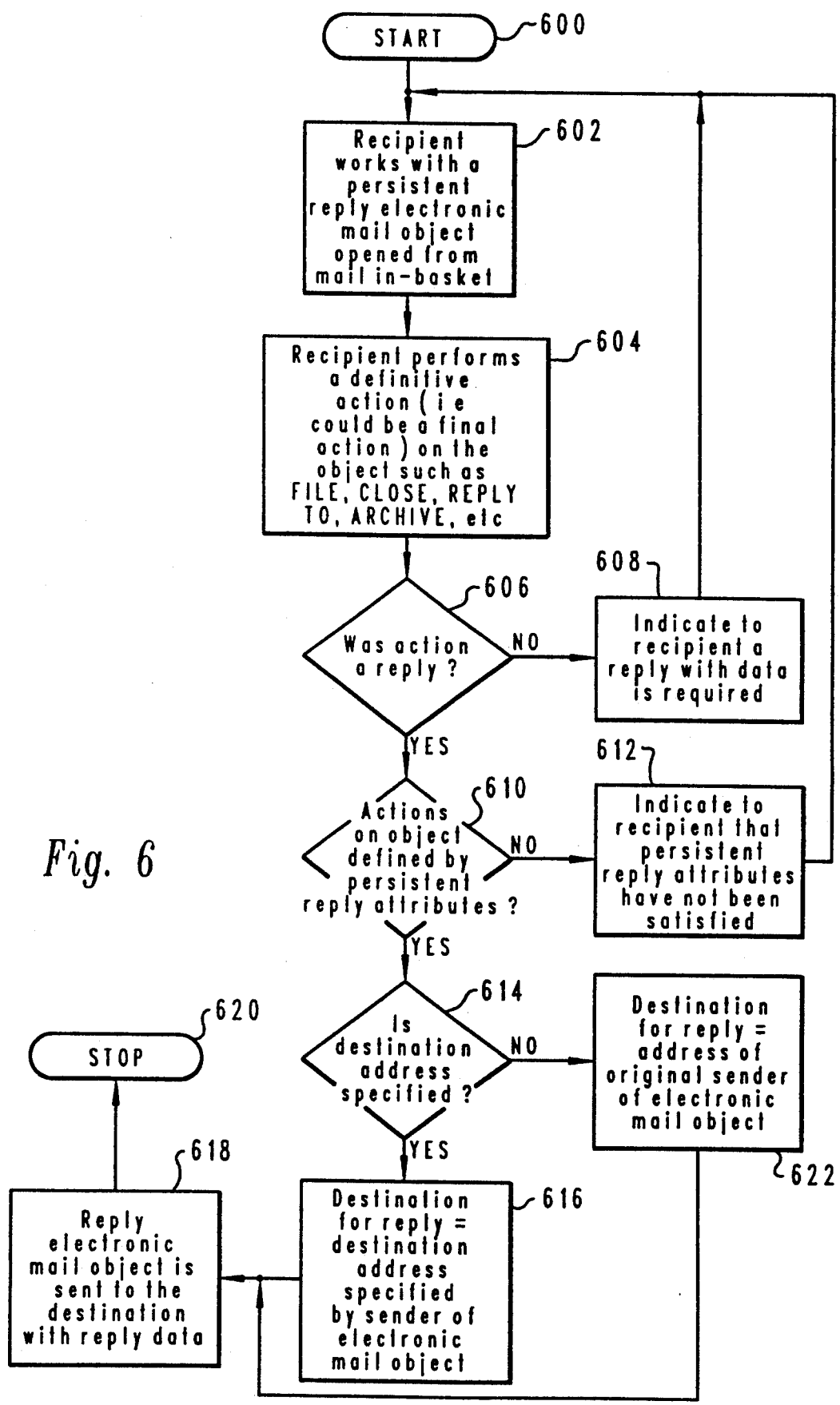
FIG. 6 is a high level flowchart of a method and system for processing an electronic mail object associated with one or more persistent reply attributes received from a sender in accordance with a preferred embodiment of the present invention.

With reference now to FIG. 6, there is depicted a high level flowchart of a method and system for processing an electronic mail object associated with one or more persistent reply attributes received from a sender in accordance with a preferred embodiment of the present invention. An electronic mail object associated with one or more persistent reply attributes is also called a persistent reply electronic mail object. As illustrated, the process begins in block 600 and thereafter proceeds to block 602, which depicts the recipient working with a persistent reply electronic mail object opened from a mail in-basket in an electronic mail system. Thereafter, the process proceeds to block 604, which illustrates the performance of a definitive action (i.e., a final action) by the recipient on the persistent reply electronic mail object such as FILE, CLOSE, REPLY TO, ARCHIVE, etc.

Next, the process proceeds to block 606, which depicts a determination of whether or not the action taken by the recipient was a reply satisfying the persistent reply attributes associated with the persistent reply electronic mail object. If the action was not a reply, the process then proceeds to block 608, which illustrates an indication to the recipient that a reply with data is required. Thereafter, the process returns to block 602 so that the recipient may work with the persistent reply electronic mail object to enter data.

Referring again to block 606, if the action taken by the recipient is determined to be a reply, the process then proceeds to block 610, which depicts a determination of whether or not the actions performed by the recipient on the persistent reply electronic mail object are actions as defined by the persistent reply attributes associated with the persistent reply electronic mail object. If the actions are not those as defined by the persistent reply attributes associated with the persistent reply electronic mail object, the process then proceeds to block 612, which illustrates an indication to the recipient that the persistent reply attributes have not been satisfied. Thereafter, the process returns to block 602 so that the recipient may work with the persistent reply electronic mail object.

Referring again to block 610, if the actions performed on the persistent reply electronic mail object are those as defined by the persistent attributes, the process then proceeds to block 614, which depicts a determination of whether or not a destination address has been specified. This destination address may be set by the sender, as illustrated in FIG. 2. If a destination address has been specified, the process then proceeds to block 616, which illustrates the setting of the destination for the reply equal to the destination address specified by the sender of the electronic mail object. Thereafter, the process proceeds to block 618, which depicts the sending of a reply electronic mail object to the destination with reply data. Subsequently, the process terminates as illustrated in block 620.

Referring back to block 614, if a destination address has not been specified, the process then proceeds to block 622, which depicts the setting of the destination for the reply equal to the address of the original sender of the persistent reply electronic mail object. Then, the process proceeds to block 618, which depicts the sending of the reply electronic mail object to the destination with the reply data. Thereafter, the process terminates as illustrated in block 620.

In accordance with a preferred embodiment of the present invention, a reply may be forced at the time that a persistent reply electronic mail object is opened. Alternatively, a recipient may be prevented from archiving or filing an electronic mail object until the designated response has been entered.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system, having a plurality of users enrolled therein and having a plurality of electronic mail objects which may be transmitted and received within said data processing system, for ensuring a specific response to a selected electronic mail object by a recipient thereof within said data processing system, said method comprising:

designating an electronic mail object as requiring a specific response;
   transmitting said electronic mail object to a recipient;

prompting said recipient of said electronic mail object for said specific response in response to said recipient opening said electronic mail object; and prohibiting a selected action until said specific response has been entered by said recipient.

2. The method of claim 1, wherein said specific response includes entering data located in said electronic mail object.

3. The method of claim 1, wherein said specific response includes entering data attached to said electronic mail object.

4. The method of claim 1, wherein said specific response includes attaching a specific graphics image to said electronic mail object.

5. The method of claim 1, wherein said specific response includes entering a verbal message, which is digitized and attached to said electronic mail object.

6. The method of claim 1 further comprising selecting said specific response required by associating said electronic mail object with an attribute specifying said specific response required from said recipient.

7. The method of claim 6, wherein said attribute also defines said selected action.

8. The method of claim 6, wherein said electronic mail object is associated with a second attribute, said second attribute specifying a destination address, wherein in response to said recipient entering said specific response, said specific response is sent to said destination address.

9. The method of claim 6, wherein said electronic mail object originates from a sender and further comprises returning said electronic mail object with said specific response to said sender in response to said recipient entering said specific response.

10. The method of claim 6, wherein said electronic mail object includes a plurality of characters and wherein said attribute specifies that said specific response requires said recipient to type over a selected number of said plurality of characters.

11. The method of claim 6, wherein said attribute specifies that said specific response requires said recipient to enter characters that are appended to said electronic mail object.

12. The method of claim 6, wherein said attribute specifies that said specific response requires said recipient to enter a selected sequence of keys.

13. The method of claim 6 further comprising in response to said recipient entering said specific response, indicating that said recipient has entered said specific response.

14. The method of claim 7 further comprising indicating that said recipient has received said electronic mail object.

15. The method of claim 7, wherein said selected action includes deleting said electronic mail object.

16. The method of claim 7, wherein said selected action includes filing said electronic mail object.

17. A data processing system, having a plurality of users enrolled therein and having a plurality of electronic mail objects which may be transmitted and received within said data processing system, for ensuring a specific response to a selected electronic mail object by a recipient thereof within said data processing system, said data processing system comprising:

designating means for designating an electronic mail object as requiring a specific response;

transmitting means for transmitting said electronic mail object to a recipient;

prompting means for prompting said recipient of said electronic mail object for said specific response in response to said recipient opening said electronic mail object; and prohibiting means for prohibiting a selected action until said specific response has been entered by said recipient.

18. The data processing system of claim 17, wherein said specific response includes entering data located in said electronic mail object.

19. The data processing system of claim 17, wherein said specific response includes entering data attached to said electronic mail object.

20. The data processing system of claim 17 further comprising selecting means for selecting said specific response required, wherein said electronic mail object is associated with an attribute specifying said specific response required from said recipient.

21. The data processing system of claim 20, wherein said attribute also defines said selected action.

22. The data processing system of claim 20, wherein said electronic mail object is associated with a second attribute, said second attribute specifying a destination address, wherein in response to said recipient entering said specific response, said specific response is sent to said destination address.

23. The data processing system of claim 20, wherein said electronic mail object originates from a sender and further comprises returning means for returning said electronic mail object with said specific response to said sender in response to said recipient entering said specific response.

24. The data processing system of claim 20, wherein said electronic mail object includes a plurality of characters and wherein said attribute specifies that said specific response requires said recipient to type over a selected number of said plurality of characters.

25. The data processing system of claim 20, wherein said attribute specifies that said specific response requires said recipient to enter characters that are appended to said electronic mail object.

26. The data processing system of claim 20, wherein said attribute specifies that said specific response requires said recipient to enter a selected sequence of keys.

27. The data processing system of claim 20, wherein said attribute specifies that said specific response requires said recipient respond with a verbal message which is digitized and attached to said electronic mail object.

28. The data processing system of claim 20, wherein said attribute specifies that said specific response requires said recipient to attach a specific graphics image to said electronic mail object.

29. The data processing system of claim 20 further comprising indicating means for indicating that said recipient has received said electronic mail object.

30. The data processing system of claim 29 further comprising in response to said recipient entering said specific response, indicating means for indicating that said recipient has entered said specific response.

31. The data processing system of claim 21, wherein said selected action includes deleting said electronic mail object.

32. The data processing system of claim 21, wherein said selected action includes filing said electronic mail object.

* * * * *